United States Patent
Maynor

(10) Patent No.: US 6,382,141 B1
(45) Date of Patent: May 7, 2002

(54) METHOD AND APPARATUS FOR USE IN LOADING LIVE ANIMALS INTO TRANSPORT VEHICLES

(75) Inventor: Terry L. Maynor, El Dorado, AR (US)

(73) Assignee: CanAgra Poultry Company, Duluth, GA (US)

( * ) Notice: Subject to any disclaimer, the term of this patent is extended or adjusted under 35 U.S.C. 154(b) by 0 days.

(21) Appl. No.: 09/624,227

(22) Filed: Jul. 24, 2000

(51) Int. Cl.[7] ............................................... B65G 11/00
(52) U.S. Cl. ...................................................... 119/843
(58) Field of Search ................................ 119/843, 844, 119/845, 847

(56) References Cited

U.S. PATENT DOCUMENTS

| | | | |
|---|---|---|---|
| 2,751,882 A | 6/1956 | Coyner | |
| 3,859,816 A | 1/1975 | McDonald et al. | 62/239 |
| 4,084,714 A | 4/1978 | Williams | 214/515 |
| 4,232,632 A | * 11/1980 | Kice | 119/843 |
| 4,301,769 A | * 11/1981 | Mola | 119/843 |
| 4,454,837 A | * 6/1984 | Luebke | 119/843 |
| 4,532,774 A | * 8/1985 | Burns | 119/843 |
| 4,835,982 A | 6/1989 | Ferdows | 62/239 |
| RE33,638 E | * 7/1991 | Lilliston, Sr. et al. | 119/883 |
| 5,168,722 A | 12/1992 | Brock | 62/304 |
| 6,014,866 A | 1/2000 | Durham | 62/201 |

* cited by examiner

Primary Examiner—Thomas Price
(74) Attorney, Agent, or Firm—Armstrong, Westerman & Hattori, LLP

(57) ABSTRACT

A method for loading live animals on a transport vehicle where the method comprises providing a transport vehicle for transporting the live animals, the vehicle having at least one compartment for containing the animals and which is partially open to the external environment. The method further includes providing a ventilation vehicle adjacent to the transport vehicle, the ventilation vehicle including at least one fan and then loading at least one animal into the compartment. While the loading is being conducted, the fan of the ventilation vehicle is operated to generate a flow of air toward and into the compartment of the transport vehicle. By use of the method, overheating of the animals while the vehicle is stationary is reduced.

10 Claims, 1 Drawing Sheet

METHOD AND APPARATUS FOR USE IN LOADING LIVE ANIMALS INTO TRANSPORT VEHICLES

The present invention relates generally to a method for loading animals onto vehicles and, more particularly, to a method for cooling and/or ventilating these live animals while such animals are loaded into vehicles. The invention further relates to portable cooling and/or ventilating apparatus for use in the method of loading live animals into vehicles.

While the method of the subject invention will be discussed primarily hereinafter with reference to a method for loading live poultry into vehicles, it is to be understood that the use and the application of the method of the subject invention is not thereby so limited. For example, the method of the invention may be useful in loading any live animal onto a vehicle where cooling and/or ventilating of the animal during the loading procedure is desirable. In addition, the benefits and advantages of the subject method are equally applicable to the unloading of live animals from transport vehicles and thus the term "loading" as used in herein encompasses both the loading and unloading processes for such animals. Further, the term "loading" as used herein also includes the time that a vehicle remains stationary after the animals have been loaded into the vehicle as well as the time while the vehicle is stationary before the animals are removed from the vehicle.

In large commercial poultry operations, it is oftentimes necessary to transport large quantities of live poultry from one location to another. For example, it is typical that poultry are raised in a number of separate rural locations and then transported to a central processing facility for converting the poultry into a salable product. For reasons of maximizing the number of transported birds and thereby minimizing transportation costs, the poultry is packed quite tightly or compactly onto the transporting vehicle during the loading operation.

The vehicle typically used for transportation of poultry is a tractor-trailer type vehicle where the trailer includes one or more cages or compartments open to the outside environment. Since the compartments generally are tightly packed with the poultry, there is a tendency for the birds to overheat due to their proximity to one other, particularly when the exterior environment is at a high temperature such as in the summer months and naturally generated airflow is negligible or non-existent. Any overheating of the poultry may cause a deterioration in the health or even death of the bird. The probability of overheating of the poultry is especially acute when the transporting vehicle is stationary since there is no air flowing through the cages caused by movement of the vehicle. On the other hand, during movement of the vehicle, there is generally sufficient air flow through the cages to prevent overheating of the poultry, even during the high temperatures encountered during the summer.

Generally, the longest periods when the vehicle containing poultry is stationary are encountered when the vehicle is being loaded or unloaded with the poultry, for example, at the poultry farm where the poultry is reared and at the processing facility. The poultry which is loaded onto the transporting vehicle first is most susceptible to overheating since these birds are confined for the longer time without the benefit of a moving airflow for cooling and ventilation purposes. In a like fashion, that poultry which is unloaded last is most susceptible to overheating for the same reasons.

It is known in the art that transport vehicles for live animals can be provided with some type of self-contained cooling or ventilating equipment to help prevent overheating of the animals while confined to the vehicle. For example, U.S. Pat. No. 2,751,882 to Croyner discloses a livestock carrying truck which is equipped with a water supply system including one or more manifolds each having spray nozzles adapted to form a fine mist of water about the livestock. Also, U.S. Pat. 4,454,837 to Luebke discloses a truck for transporting boxes of poultry having equipment such as an electrically powered air conditioner for circulating air from a floor cavity into a confined load space for the poultry.

A distinct disadvantage to the provisions described in these patents is that it is relatively expensive to provide each transport vehicle with such cooling or ventilating equipment. For commercial operations employing significant numbers of vehicles, the costs associated with modifying existing vehicles to include such equipment would be significant. In addition, it may be considered undesirable or unsanitary to utilize the application of water to the animals since the water tends to distribute waste from the animals into the adjacent environment.

SUMMARY OF THE INVENTION

It therefore is a feature of the subject invention to provide a method for loading and/or unloading live animals such as poultry which provides sufficient cooling and/or ventilation for the animals so as to help prevent overheating of the animals.

It also is a feature of the subject invention to provide a method for loading and/or unloading live animals such as poultry which is relatively inexpensive to implement.

It is yet another feature of the subject invention to provide a method for loading and/or unloading live animals such as poultry which is relatively simple to conduct and requires minimal personnel for its operation.

It is a feature of the subject invention to provide a apparatus for use in loading and/or unloading live animals such as poultry which can be repeatedly used with a plurality of vehicles for transporting such animals.

It further is a feature of the subject invention to provide a apparatus for use in loading and/or unloading live animals such as poultry which is relatively inexpensive.

Briefly, the present invention comprehends in its broader aspects a method for loading live animals on a transport vehicle, the method comprising:

providing a transport vehicle for transporting the live animals, the vehicle having at least one compartment for containing the animals and which is partially open to the external environment;

providing a ventilation vehicle adjacent to the transport vehicle, the ventilation vehicle including at least one fan;

loading at least one animal into the compartment; and while the loading is being conducted, operating said fan of said ventilation vehicle to generate a flow of air toward and into the compartment of the transport vehicle.

The present invention also comprehends an apparatus for use in a method of loading of animals onto a transport vehicle having at least one compartment for containing the animals and which is partially open to the external environment, the apparatus comprising a wheeled vehicle comprising a flat bed trailer, at least one evaporative cool unit carried by the wheeled vehicle, a tank carried by the wheeled vehicle, the tank adapted to contain water for supply to said evaporative cooling unit, and a supply line between the tank and the cooling unit for supplying water to the cooler.

Further features, objects and advantages of the present invention will become more fully apparent from a detailed consideration of the arrangement of the steps and conditions of the subject processes as set forth in the following description when taken together with the accompanying drawings.

DETAILED DESCRIPTION OF THE PREFERRED EMBODIMENTS

As was previously mentioned, the subject invention is directed in one of its aspects to a method for loading live animals onto a vehicle. For the purposes of illustration only, the subject method is described hereinafter with reference to a particularly preferred method which utilizes the apparatus shown in the attached drawings.

Figure 1:
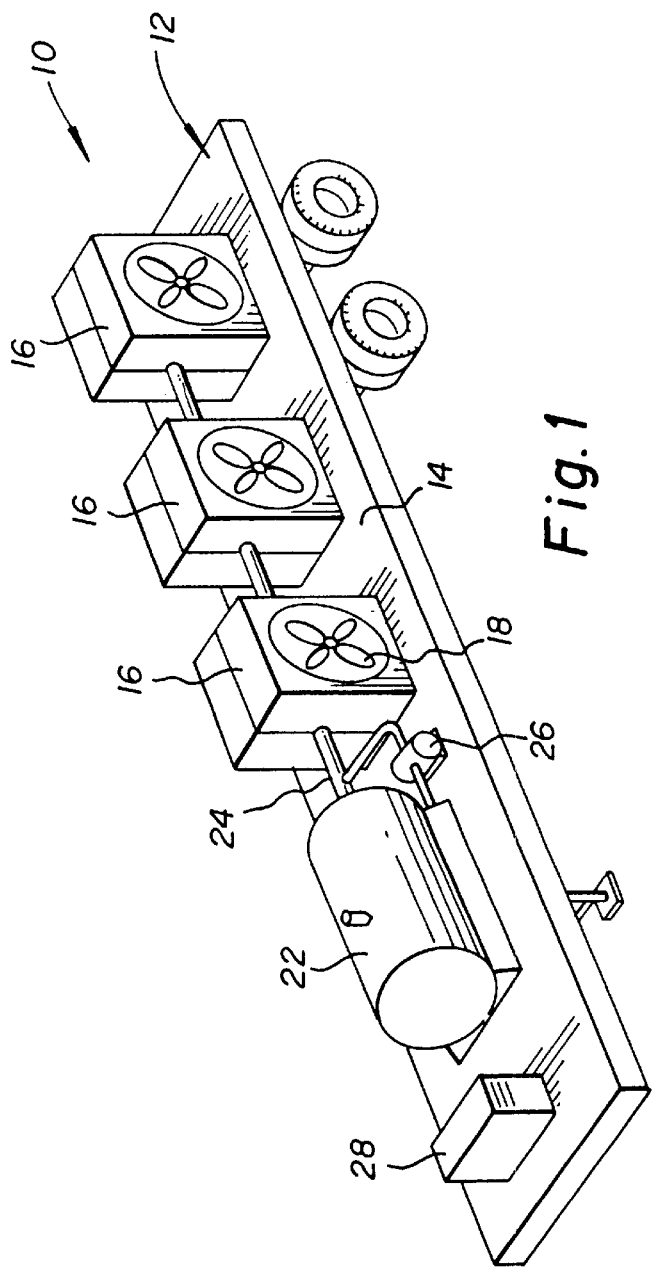
FIG. 1 is a perspective view of a portable cooling apparatus in accordance with the present invention and which may be used in the method of the subject invention.

Shown in FIG. 1 is ventilation vehicle 10 for cooling live animals as the animals are loaded onto a transport vehicle. The vehicle 10 as illustrated includes a conventional flat bed trailer 12 which is adapted to be attached and transported by a conventional tractor type truck (not shown in this figure). Secured to the upper surface of the bed 14 of trailer 12 are a plurality of cooling units 16. In the embodiment shown, each cooling unit 16 is of the evaporative cooling type which function by distributing water over a porous media (not shown) while drawing air through the wetted media with a motorized fan or blower 18. In operation of such a unit 16, the heat is removed from the air flowing through the media as the water evaporates and thus the temperature of the air is lowered.

Evaporative cooling units 16 can provide relatively inexpensive air conditioning in warm, dry environments with relative low humidity. These units can provide twenty to thirty degrees of cooling relatively inexpensively. At higher humidity environments, the degree of cooling is correspondingly reduced, but may be satisfactory for most purposes for the purposes of the present invention. Particularly preferred evaporative cooling units for use in the present invention are the units sold under the tradename PORT-A-COOL by General Shelters of Texas, S.B., Ltd., of Center, Tex.

Also secured to the upper surface of the bed 14 of trailer 12 is water tank 22 adapted to contain a supply of water for evaporative cooling units 16, the tank being connected to the units by pipe 24. Electric water pump 26 is provided to supply water from tank 22 to each cooling unit 16. Electrical power is supplied to pump 26 and to motorized fans 18 of cooling units 16 by portable generator 28 which is also secured to the upper surface of bed 14 of trailer 12.

Figure 2:
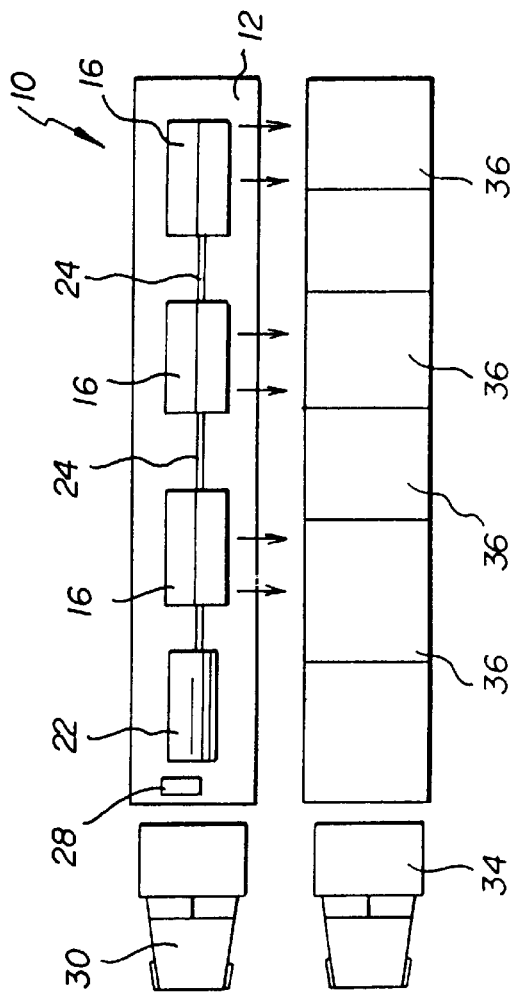
FIG. 2 illustrates in a top plan view a preferred aspect of a method for loading live animals onto a transport vehicle.

The use of the apparatus including trailer 12 in accordance with the concepts of the present invention is illustrated in FIG. 2 which is an overhead view of trailer 12 with associated tractor 30 parked adjacent to trailer 32 and associated tractor 34. Trailer 32 is adapted for transporting live animals such as poultry and includes a plurality of compartments or cages 36 for containing the animals being transported. The compartments 36 are open to the external atmosphere by being formed of slats, bars, wires, mesh or the like so as to allow air circulation through the containers while still confining the animals therein.

Trailer 32 is parked adjacent to a facility (not shown) such as a feeding shed where poultry are raised. The poultry are then loaded into containers 36 of trailer 32. Prior to commencement of the loading of the poultry, for example, tractor 30 is used to move trailer 12 into a position adjacent to trailer 32 such that air emanating from cooling units 16 will be directed into containers 36. As shown in FIG. 2, trailer 12 is parked generally parallel to trailer 32. As loading of the poultry into trailer 32 proceeds, cooling units 16 are activated and cooled air is directed from the cooling units into the containers as illustrated by the arrows in FIG. 2, the flow of air generated by fans 18 also forcing air circulation within the containers and thereby ventilating same. As a result, poultry already loaded into containers 36 are maintained at a more healthy environment during the loading process.

Once trailer 32 is completely loaded, it may be advantageous for the well-being of the poultry to continue the operation of cooling units 16 until the trailer begins its travel to another destination. Once underway, the flow of air through containers 36 which is generated by movement of the tractor-trailer combination 32 and 34 generally will be sufficient to prevent overheating of the poultry. Once the loaded trailer 32 reaches its destination such as a processing facility, another vehicle for the purposes of cooling such as a trailer similar to trailer 12 may be parked adjacent to trailer 32 while the poultry are unloaded therefrom to provide the necessary air circulation and/or cooling until unloading is complete.

Generally speaking, the conditions for operating the subject method may vary considerably as indicated above depending upon, among other things, the particular animal being loaded or unloaded, the type of vehicle being used for transportation of the animal and the ambient environmental conditions, particularly in terms of temperature and/or humidity. Thus, for some operations, it is not necessary to provide an air cooling effect, but simply ensuring adequate ventilation by the flow or circulation of air during loading or unloading may be sufficient. For example, if the ambient conditions of the transporting vehicle are not particularly severe, it may be sufficient to utilize a fan or blower alone to merely provide air circulation within the vehicle transporting the animals. It may be advantageous to operate the ventilating and/or cooling units during the time that a transport vehicle remains stationary after the animals have been loaded into the vehicle to help prevent adverse effects on the animals. In a like fashion, it may be advantageous to operate the ventilating and/or cooling units during the time while the vehicle is stationary before the loaded animals are removed from the vehicle. During the loading, it may be advantageous to slightly move trailer 12 one or more times relative to trailer 30 to ensure that all animals contained in containers 36 receive air flow from units 16.

While the method of the invention has been found to be particularly adapted and advantageous for use in the transport of poultry such as chickens and the like which are particularly susceptible to elevated temperatures, it is also applicable for the transport of other commercial animals such as cattle, swine and the like.

In addition, although the ventilation vehicle illustrated in the drawings includes a flatbed trailer 12, it is to be recognized that other vehicles could be used equally as well for supporting and conveying air circulating and/or air cooling equipment. For example, the vehicle could be a partially closed trailer or any other type of truck such as a stake bed truck, pick-up truck and the like. The trailer 12 as shown is particularly advantageous in providing air circulation and/or cooling to animal transport vehicle of the same type, that is, a trailer adapted to be pulled by a tractor, since the length of the trailer is approximately the same as the animal transporting trailer and thus air and/or cooling can be provided through most if not all of the entire animal transporting trailer.

In a somewhat similar fashion, the subject invention is not limited to the use of three evaporative cooling units for providing air ventilation and/or air cooling such as shown in Figure 1. Obviously, the number of cooling units utilized is dependent upon, among other things, the size of the animal transporting vehicle, the number of animals to be treated, and the desired air circulation and/or cooling effect. Furthermore, the subject invention is not limited to the use of evaporative cooling units in providing the air circulation and/or air cooling. Clearly, other alternative equipment may be utilized such a fans, blowers, refrigerators, combinations thereof and the like. Generally, cooling systems which utilize mists and the like which are propelled or sprayed directly onto the animals are less preferred for environmental reasons.

As is apparent from the above, the method of the present invention provides air ventilation and/or cooling for animals as such animals are being loaded or unloaded from a transport vehicle. While it is possible to provide such air ventilation and/or cooling equipment in each vehicle used for transporting animals, such a provision would be prohibitively expensive. Therefore, a distinct advantage of the subject method and system is that one apparatus for providing air circulation and/or air cooling can service a number of animal transport vehicles at the particular time when such air ventilation and/or air cooling are the most needed, that is, when the vehicle is stationary or at rest such as when the vehicle is being loaded or unloaded. As explained above, once the animal transport vehicle is underway, the movement of the vehicle generally creates sufficient air circulation to ensure the well-being of the animals being transported. In addition, the method and apparatus according to the present invention are relatively easy to conduct and generally can be accomplished with a minimum of operators.

While there has been shown and described what are considered to be preferred embodiments of the present invention, it will be apparent to those skilled in the art to which the invention pertains that various changes and modifications may be made therein without departing from the invention as defined in the appended claims.

What is claimed is:

1. A method for loading live animals on a transport vehicle, the method comprising:

providing a transport vehicle for transporting the live animals, the vehicle having at least one compartment for containing the animals and which is partially open to the external environment;

providing a ventilation vehicle adjacent to the transport vehicle, the ventilation vehicle including at least one fan;

loading at least one animal into the compartment; and while the loading is being conducted, operating said fan of said ventilation vehicle to generate a flow of air toward and into the compartment of the transport vehicle.

2. The method of claim 1 wherein the ventilation vehicle includes an evaporative cooling unit containing the fan and said flow of air toward and into the compartment of the transport vehicle is cooled air.

3. The method of claim 2 wherein the ventilation vehicle includes a plurality of evaporative cooling units, each cooling unit generating a flow of air toward and into the compartment of the transport vehicle.

4. The method of claim 3 wherein the ventilation vehicle includes a flat bed trailer supporting the evaporative cooling unit.

5. The process of claim 4 wherein the transport vehicle includes a flat bed trailer and said flat bed trailer of said ventilation vehicle is located parallel to the flat bed trailer of the transport vehicle.

6. The method of claim 1 wherein said fan of said ventilation vehicle is operated to generate a flow of air toward and into the compartment of the transport vehicle after the animals after the animals have been loaded.

7. The apparatus in accordance with claim 1 wherein the evaporative cooling unit includes a fan.

8. The apparatus of claim 7, further including a generator for supplying electrical power to said fan of the evaporative cooling unit.

9. The apparatus in accordance with claim 7, wherein the wheeled vehicle is a flat bed trailer.

10. An apparatus for use in a method of loading of animals onto a transport vehicle having at least one compartment for containing the animals and which is partially open to the external environment, the apparatus comprising a wheeled vehicle comprising a flat bed trailer, at least one evaporative cooling unit carried by the wheeled vehicle, a tank carried by the wheeled vehicle, the tank adapted to contain water for supply to said evaporative cooling unit, and a supply line between the tank and the cooling unit for supplying water to the cooler, whereby operating said evaporative cooling unit of said ventilation vehicle generates a flow of air toward and into the compartment of the transport vehicle.

* * * * *